(12) United States Patent
Smith

(10) Patent No.: US 7,409,722 B2
(45) Date of Patent: Aug. 5, 2008

(54) CONTROL STATUS REGISTER ACCESS TO ENABLE DOMAIN RECONFIGURATION

(75) Inventor: Brian L. Smith, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1061 days.

(21) Appl. No.: 10/427,566

(22) Filed: May 1, 2003

(65) Prior Publication Data

US 2004/0221036 A1 Nov. 4, 2004

(51) Int. Cl.
*H04L 9/00* (2006.01)
(52) U.S. Cl. ................................................. 726/27
(58) Field of Classification Search .................... 726/27
See application file for complete search history.

(56) References Cited

U.S. PATENT DOCUMENTS

| | | | | |
|---|---|---|---|---|
| 5,016,277 A | * | 5/1991 | Hamilton | 713/150 |
| 5,548,711 A | * | 8/1996 | Brant et al. | 714/5 |
| 5,666,516 A | * | 9/1997 | Combs | 711/163 |
| 5,790,775 A | * | 8/1998 | Marks et al. | 714/9 |
| 6,883,065 B1 | * | 4/2005 | Pittelkow et al. | 711/114 |

* cited by examiner

*Primary Examiner*—Matthew Heneghan
(74) *Attorney, Agent, or Firm*—Meyertons Hood Kivlin Kowert & Goetzel, P.C.; Rory D. Rankin

(57) ABSTRACT

A method and mechanism for enabling access to a protected register in a client. A system including multiple clients, such as components and devices, is coupled to a service processor which is configured to manage the system. Clients which are managed by the service processor include control and status registers which are protected from access by unauthorized entities. Access rights for particular registers may be restricted to only the service processor. Clients include a timer which the service processor periodically updates. In the event communication is lost between the service processor and a client, the timer is not updated. In response to detecting the timer was not updated, the client is configured to alter the access rights of the register in order to permit an alternate entity to access the protected register. The service processor may then utilize the alternate entity as a proxy in order to transfer the client state to another client and configure the affected client out of the system.

26 Claims, 4 Drawing Sheets

CONTROL STATUS REGISTER ACCESS TO ENABLE DOMAIN RECONFIGURATION

BACKGROUND OF THE INVENTION

1. Field of the Invention

This invention relates to the field of multiprocessor computer systems and, more particularly, to computer system reconfiguration.

2. Description of the Related Art

Multiprocessing computer systems include two or more processors which may be employed to perform computing tasks. For example, a particular computing task may be performed upon one processor while other processors perform unrelated computing tasks. Alternatively, components of a particular computing task may be distributed among multiple processors to decrease the time required to perform the computing task as a whole.

Many enterprises today utilize multiprocessing computer systems, and other systems in which resources are shared, cooperate, or otherwise function to accomplish various tasks. In some cases, these systems include multiple resources which are allocated for particular tasks. Resources which are allocated for particular tasks, or which are allocated for use by particular groups, may be logically grouped together into a separate domain. A particular system may include multiple domains. For example, separate domains within a system may be configured for different departments in an organization such as accounting and research. Domains may be configured in such a manner that each domain operates independently of the other and does not have access to the resources or data of the other.

Generally speaking, centralized management of such systems is desired. Numerous management and system administration tasks may be handled by a service processor. Examples of such management tasks include inserting or removing a system board, logically attaching or detaching a board, creating, removing, or renaming a domain, performing a bringup operation on a domain, rebooting a domain, automatic domain recovery operations due to events such as system panics or hardware failures, and so on.

Having centralized management may not only be more convenient for a system administrator, but may also provide for greater security. Given that separate domains are frequently isolated from one another and are not permitted access to other domains, allowing a processor or other resource within a domain to manage the entire system may lead to a serious breach in security. Consequently, by centralizing system management in a dedicated "service processor", greater security may be obtained.

While centralized management may provide for greater convenience and security, such an approach also presents its own problems. Because management tasks are dedicated to a centralized service processor, and other resources in the system are not permitted to perform such tasks, loss of communication between the service processor and the system may pose a serious problem. For example, if a system board malfunctions and the service processor is not able to communicate with the system in order to remedy the problem, it may be necessary to bring down the entire system in order to correct the problem.

Accordingly, a method and mechanism for efficient system management is desired.

SUMMARY OF THE INVENTION

The problems outlined above may in large part be solved by a method and mechanism as described herein.

Generally speaking, a method and mechanism for enabling access to protected registers is contemplated. In one embodiment a system including multiple clients, such as components and devices, is coupled to a service processor via a service processor bus. The service processor is configured to manage the system and may have privileged status. Clients which are managed by the service processor include control and/or status registers which are protected from access by unauthorized entities. Access rights for particular registers may be restricted to only the service processor. Clients may include processors, memory controllers, I/O devices, or any other suitable entity.

Because only the service processor has access to these protected registers, a loss of communication between a client and the service processor could prevent management of the system. Accordingly, clients include a timer which the service processor periodically updates. In the event communication is lost between the service processor and a client, the timer is not updated. In response to detecting its timer was not updated, the client is configured to alter the access rights of the protected register in order to enable an alternate entity to access the protected register. Subsequently, the alternate entity may access the affected client's protected registers, transfer the current state of the client to another client, and disable the affected client. In one embodiment, the service processor is configured to control the alternate entity as a proxy in order to transfer the client state to another client and configure the affected client out of the system.

BRIEF DESCRIPTION OF THE DRAWINGS

Other objects and advantages of the invention will become apparent upon reading the following detailed description and upon reference to the accompanying drawings in which.

Figure 1:
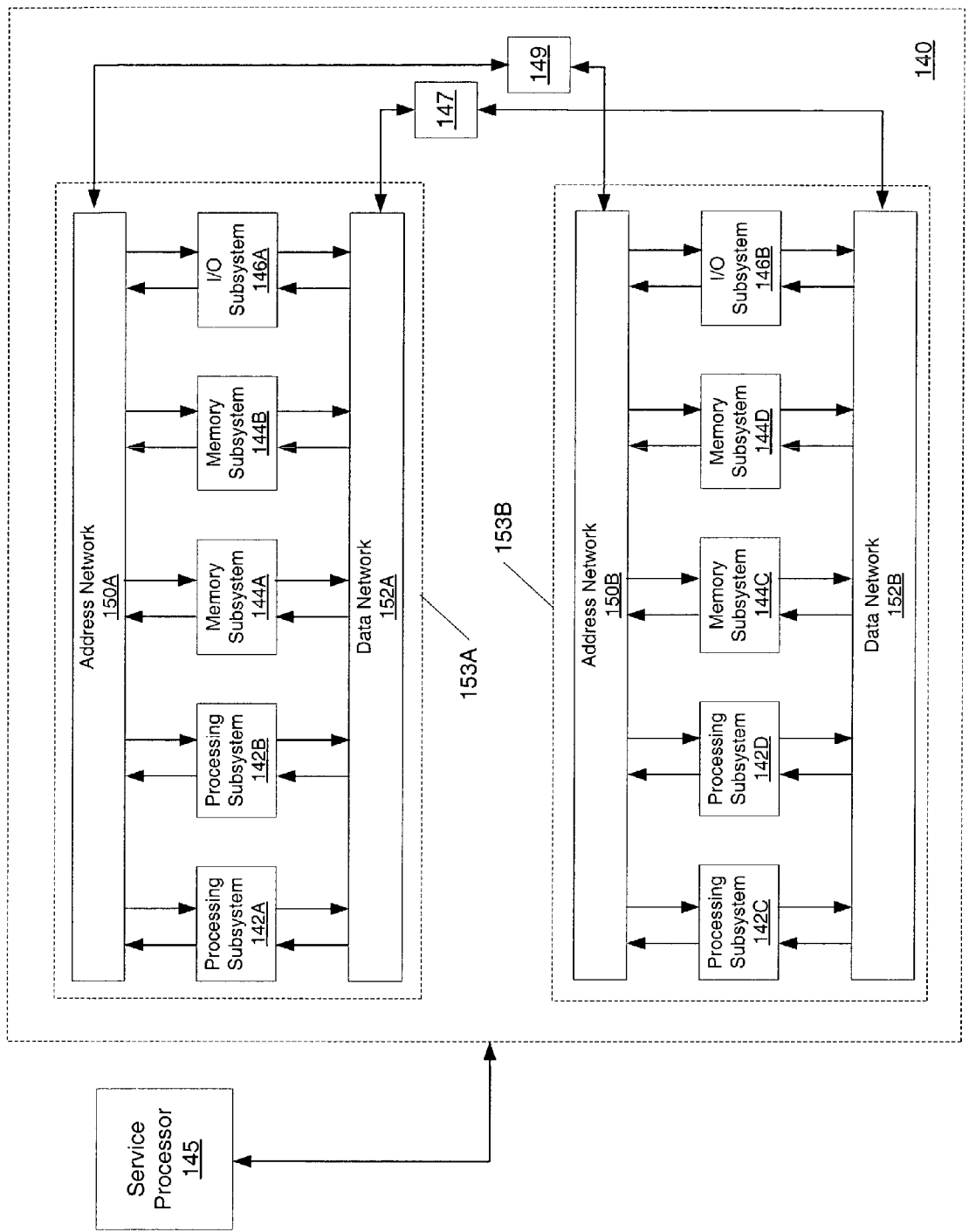
FIG. 1 is a block diagram of one embodiment of a multiprocessing node and service processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 is a block diagram of one embodiment of a computer system 140. Computer system 140 includes system board 153A and 153B. System board 153A includes processing subsystems 142A and 142B, memory subsystems 144A and 144B, and an I/O subsystem 146 interconnected through an address network 150 and a data network 152. System board 153B includes processing subsystems 142C and 142D, memory subsystems 144C and 144D, and I/O subsystem 146B. Additionally, address networks 150A and 150B may be coupled via interconnect 149, and data networks 152A and 152B may be coupled via interconnect 147. In addition, a service processor 145 is shown coupled to system 140. Computer system 140 may be referred to as a "platform". As used herein, the term "platform" refers to a group of clients which may share common address and data networks. In the embodiment of FIG. 1, each of processing subsystems 142, memory subsystems 144, and I/O subsystem 146 may be considered a client. It is noted that, although five clients are shown in each of boards 153 in FIG. 1, embodiments of computer system 140 employing any number of clients are contemplated. Elements referred to herein with a particular reference number followed by a letter will be collectively referred to by the reference number alone. For example, processing subsystems 142A-142B will be collectively referred to as processing subsystems 142.

Generally speaking, each of processing subsystems 142 and I/O subsystem 146 may access memory subsystems 144. Each client in FIG. 1 may be configured to convey address transactions on address network 150 and data on data network 152 using split-transaction packets. Typically, processing subsystems 142 include one or more instruction and data caches which may be configured in any of a variety of specific cache arrangements. For example, set-associative or direct-mapped configurations may be employed by the caches within processing subsystems 142. Because each of processing subsystems 142 within node 140 may access data in memory subsystems 144, potentially caching the data, coherency must be maintained between processing subsystems 142 and memory subsystems 144.

Memory subsystems 144 are configured to store data and instruction code for use by processing subsystems 142 and I/O subsystem 146. Memory subsystems 144 preferably comprise dynamic random access memory (DRAM), although other types of memory may be used. Each address in the address space of node 140 may be assigned to a particular memory subsystem 144, referred to as the home subsystem of the address. Further, each memory subsystem 144 may include a directory suitable for implementing a directory-based coherency protocol. In one embodiment, each directory may be configured to track the states of memory locations assigned to that memory subsystem within node 140. For example, the directory of each memory subsystem 144 may include information indicating which client in node 140 currently owns a particular portion, or block, of memory and/or which clients may currently share a particular memory block. Additional details regarding suitable directory implementations will be discussed further below. While the example of FIG. 1 illustrates a system with a directory-based protocol, those skilled in the art will appreciate that the method and mechanism described herein are applicable to numerous other systems and configurations.

In the embodiment shown, data network 152 is a point-to-point network. However, it is noted that in alternative embodiments other networks may be used. In a point-to-point network, individual connections exist between each client within the node 140. A particular client communicates directly with a second client via a dedicated link. To communicate with a third client, the particular client utilizes a different link than the one used to communicate with the second client.

Address network 150 accommodates communication between processing subsystems 142, memory subsystems 144, and I/O subsystem 146. Operations upon address network 150 may generally be referred to as address transactions. When a source or destination of an address transaction is a storage location within a memory subsystem 144, the source or destination is specified via an address conveyed with the transaction upon address network 150. Subsequently, data corresponding to the transaction on the address network 150 may be conveyed upon data network 152. Typical address transactions correspond to read or write operations. A read operation causes transfer of data from a source outside of the initiator to a destination within the initiator. Conversely, a write operation causes transfer of data from a source within the initiator to a destination outside of the initiator. In the computer system shown in FIG. 1, a read or write operation may include one or more transactions upon address network 150 and data network 152.

Service processor 145 is configured to manage platform 140. For example, service processor 145 may be configured to facilitate inserting or removing system resources, logically attaching or detaching resources, creating, removing, or renaming a domain, performing a bring-up operation on a domain, rebooting a domain, automatic domain recovery operations due to events such as system panics or hardware failures, moving clients between domains, and so on.

Figure 2:
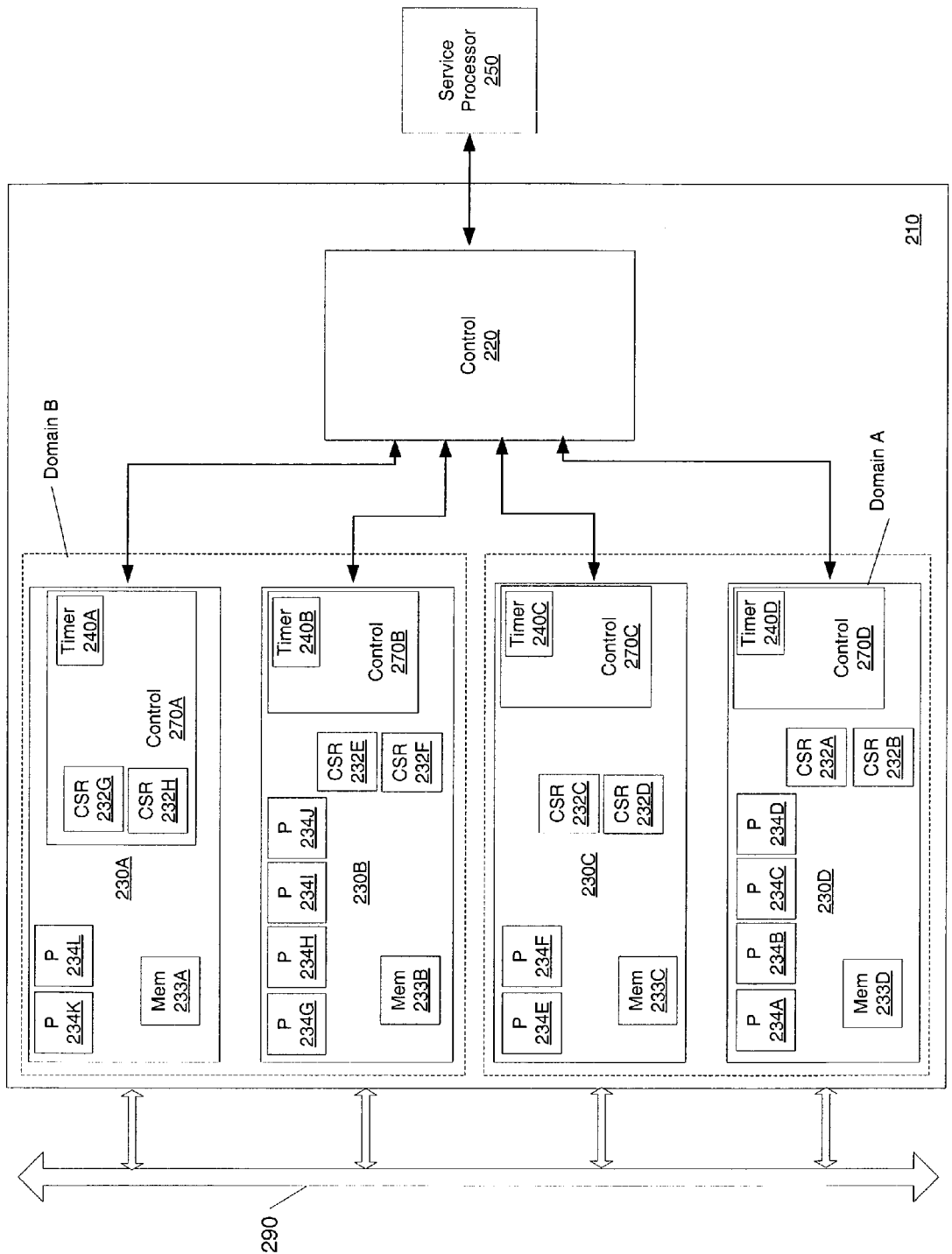
FIG. 2 illustrates one embodiment of a multiprocessing node and service processor.

Turning now to FIG. 2, a platform 210 is depicted which is configured to enable domain reconfiguration in the event of a failed communication with a service processor 250. In the embodiment shown, platform 210 includes four system boards 230A-230D, and a control board 220. Each of system boards 230 includes processors 234, memory 233, control and status registers 232, and control circuitry 270 including a timer 240. System boards 230 are coupled to control board 220. Also illustrated is a service processor 250 configured to manage platform 210. In one embodiment, service processor 250 is configured to communicate with platform 210 via a private Ethernet link, though other embodiments are possible and are contemplated. Service processor 250 may be configured to communicate with each of boards 230, as well as individual components of boards 230, through control board 220. Also illustrated is an operations bus 290 which is coupled to numerous components in the system 210 and enables communication among such components. In one embodiment, operations bus 290 comprises a network including point-to-point links between components in the system 210.

Control and status registers 232 are generally configured to maintain either status information concerning the operation of a corresponding system board 230, or registers 232 are utilized in configuring operation of a corresponding board 230 and its components. In one embodiment, platform 210 comprises a backplane to which system boards 230 and control board 220 are attached. The platform backplane may include address and data buses which are utilized by system boards 230 or other clients or components of the system 210. It is noted that other implementations of platform 210 are possible. For example, other embodiments may not utilize individual system boards 230 or a backplane. Rather, system components and circuitry may be integrated into a single chip. Numerous alternatives are possible.

In the embodiment of FIG. 2, system boards 230 have been configured into separate domains. Domain A includes system board 230C and system board 230D. Domain B includes system board 230A and 230B. Domains A and B may be configured to run independent operating systems which may be the same or different operating systems. Certain control and status registers 232 may be configured with differing access rights. It is noted that numerous components within a system may include control and/or status registers which correspond to the operations of that particular component. For example, processors may include their own control and status registers, memory controllers may include their own control and status registers, I/O controllers may include their own control and status registers, and so on. Generally speaking, control and/or status registers which correspond to a particular component may be accessible by only that component and/or a service processor. For example some control and status registers 232 may be accessible by both processors 234 and service processor 250, while others are only accessible by service processor 250. In one embodiment, control and status registers 232 which are accessible by clients within a particular domain are accessible only by clients within the same domain. Accordingly, control and status registers 232A and 232B may be accessible by processors 234A-234F, but not by processors 234G-234L. All control and status registers 232 are generally, though not necessarily, accessible by service processor 250.

In the embodiment shown, control circuitry 270 is configured to manage access to each of the illustrated control and status registers 232. In one embodiment, control circuitry 270 may represent a particular application specific integrated circuit (ASIC) configured to perform a specific system board 230 function. In such an embodiment, the control and status registers 232 illustrated in a particular board 230 may be registers within the control circuit 270 and may correspond to the control and status of that particular control circuit. For example, in one embodiment control circuit 270 may represent a memory controller. While registers 232G-232H are illustrated to be within circuit 270A, control and status registers need not be physically within a corresponding circuit.

Limiting access to certain registers 232 ("protected" registers) by only service processor 250 may be necessary to enhance both security and reliability. For example, accidental modifications to particular registers 232 may cause undesirable changes in system configuration which may lead to data loss, system failure, or other unpredictable results. Consequently, certain control and status registers 232 are made non-accessible by other than the service processor 250. In addition to accidental register 232 modifications, intentional and/or otherwise malicious modification are possible may also occur if control and status registers 232 are completely open to access. Typically the service processor 250 is operated by a system administrator who may manage the system in a controlled manner.

In one embodiment, accesses to control and status registers 232 include an indication of the source of the access. For example, service processor 250 read or write transactions to control and status registers 232 may include an identification (ID) corresponding to the service processor 250. In one embodiment this ID may correspond to a bus agent of the service processor 250. Control circuitry 270 may then receive a transaction directed to a register 232 and determine whether the source of the transaction (as identified by the ID) is authorized to access the targeted register 232. In the event the source is an authorized service processor 250, for example, the access is permitted. On the other, if the source of the transaction is not authorized to access the targeted register 232, the control circuit 270 may prevent the access and convey a signal to the service processor 250 indicating the attempted access. In response to receiving the indication of the attempted unauthorized access, the service processor 250 may then reconfigure the system to remove, disable, or otherwise prevent further access by the source of the attempted access.

Because access to particular control and status registers 232 may be limited to the service processor 250, a failure of communication between the service processor 250 and one of boards 230 may render configuration of the system 210 impossible without system interruption. Consequently, maintaining communication between the service processor 250 and each of the system components controlled by the service processor 250 is critical. Therefore, platform 210 is configured to indicate the loss of communication between a component and the service processor 250 and enable alternate access to the affected component's protected registers 232.

As noted above, each of control circuits 270 may include a timer 240. In one embodiment, service processor 250 is configured to periodically reset each of timers. In one embodiment, for example, service processor 250 may periodically broadcast a signal configured to reset all timers 240. In the event a control circuit 270 detects that its timer 240 has not been reset within a predetermined period of time, the component which corresponds to that timer may convey an error indication to the service processor 250. In one embodiment, the error indication may include an identification of the affected component. As the communication link between the service processor 250 and the affected component may be impaired, the error indication may be conveyed via an alternate path.

In addition to conveying an error indication to the service processor 250, the control circuit 270 may change the access rights of one or more control and status registers 232 in order to allow an alternate entity to access those registers. Service processor 250 may then direct another entity, another processor 234 within the domain for example, to access the control and status register(s) 232 of the affected component. This alternate processor 234, acting as a proxy for the service processor, may then reconfigure the affected component in such a way that reliable system operation is preserved. For example, if the affected component is a memory controller, the contents of the memory controlled by that memory controller may be transferred to another memory (e.g., on another board) and the board which includes the affected memory controller may be reconfigured out of the system. Other system state may be transferred from the affected board/components as well. In this manner, loss of data or other system impairment may be minimized and the affected board may be removed from the system for repair. Different components will generally include different types of data and state which may be transferred. For example, in the case of a processor the processor state may be transferred. Alternatively, a controller may have an alternate path enabled. All such transfers of data and/or state and reconfigurations are contemplated.

While the above technique permits reconfiguration of the system in the event of a communication failure, maintaining a desired level of security may also be a concern. In one embodiment, in the event of a failed communication as described above, the service processor 250 bus agent may be remapped to a special ID. Control circuits 270 may be configured to respond to this special ID only if their timer 240 has expired. The service processor 250 may then direct an alternate entity to perform the above described reconfiguration utilizing this special ID. Accordingly, access by an alternate entity to a protected register 232 may require both a special indication (such as the above described special ID, or alternatively a special command type) and the expiration of the timer 240 which corresponds to the targeted register 232. In this manner, an unauthorized entity may be prevented from accidentally or maliciously attempting to access circuits 270 in the system whose timers 240 have not expired. In the event an access to a protected register is attempted where the corresponding timer has not expired, the client containing the register may notify the service processor 250 of the attempted access. The service processor 250 may then disable the entity which attempted the access or take any other suitable action.

In the event a transaction attempting an access to a protected register is detected when the timer 240 has not expired, the control circuit 270 may be configured to deny the attempted access. As used herein, denying access may include ignoring the transaction, completing the transaction without returning any privileged data, responding with data which indicates the register is not accessible, or take any other action deemed suitable.

Figure 3:
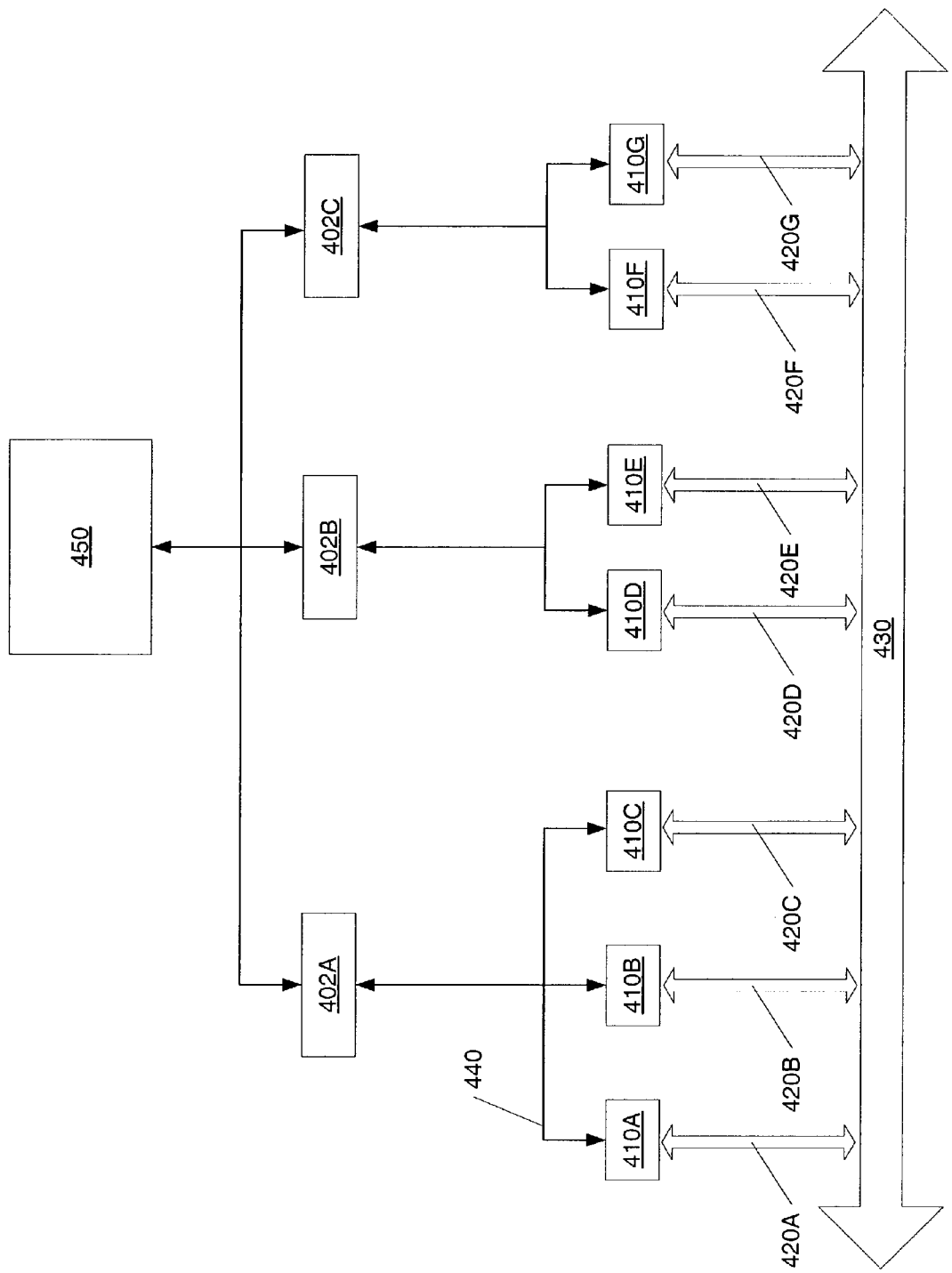
FIG. 3 shows one example of a system configured to support reconfiguration by a proxy.

FIG. 3 illustrates one embodiment of a system including a service processor 450, service processor bus masters 402A-402C, and system components 410A-410G. Also shown is an operations bus 430 coupled to each of components 410 via links 420A-420G. In one embodiment, links 420 may be considered part of operations bus 430. As noted above, operations bus 430 may enable point-to-point communication between components 410. Alternative embodiments may utilize one or more shared buses for communication between components 410. Components 410 may include one or more control and status registers. In addition, while the bus coupling the service processor 450 with components 410 is configured as a tree, other embodiments may be configured differently.

To illustrate operation of the system illustrated in FIG. 3, assume component 410A includes a register which is configured for access by the service processor 450 only. In one embodiment, service processor 450 communicates with component 410A via bus master 402A. When service processor 450 accesses the protected register of component 410A, commands issued by the service processor 450 may include an indication (e.g., a bus master ID corresponding to the service processor 450 and/or, alternatively, bus master 402A) that the initiator of the command is authorized to access the targeted register. Component 410A may be configured to permit accesses to the protected register only if the authorized bus master ID is included in the access. Assume further that component 410A includes a timer as described above which is periodically reset by the service processor 450.

In the event that link 440 is broken and the service processor 450 is unable to reset the timer of component 410A, component 410A may detect the expiration of the timer and convey an error signal/indication to the service processor 450. As link 440 is inoperative, component 410A may be configured to convey the error indication via an alternate path. For example, the error indication may be conveyed via the operations bus to the service processor. In addition to indicating the error condition, the component may be further configured to remove the access restrictions on the protected register. Restrictions on access to the protected register of component 410A may be completely removed, or the restrictions may be altered to allow another entity to access the protected register.

In one embodiment, the service processor 450 may be configured to convey a command to update a client timer via one bus, and receive an acknowledgement from the client via a second bus. As already described above, a failure of the first bus results in the timer expiring due to its not being updated. Alternatively, a failure of the second bus may occur. In the event the second bus fails the timer may in fact be updated, but a corresponding acknowledgement from the client to the service processor 450 may never be received by the service processor 450. In such an embodiment, rather than the service processor 450 receiving an explicit error indication from the client, the service processor 450 detects an error condition based upon a failure to receive an acknowledgement from the client. Subsequent to detecting such an error, the service processor 450 may access the affected client via an alternate path in order to ascertain whether or not the client is receiving the service processor 450 commands and take any other action deemed appropriate.

In one embodiment, component 410A alters the restrictions on its protected register to change access permission to allow another component access, e.g., component 410D. The service processor 450 may then utilize the other component as a proxy to access the register of component 410A. The service processor may then issue the necessary commands, and take any other suitable action, to transfer state from component 410A to another component 410 and configure component 410A out of the system.

To enhance security, component 410A may be configured to recognize another component as having permission to access its protected register only if the timer of component 410A has expired or otherwise not been reset. In this manner, inadvertent or malicious accesses by the other component (or a component masquerading as this other component) may be prevented. In an alternative embodiment, component 410A alters the restrictions on its protected register to allow access permission if (i) a received command is of a special command type, and (ii) the timer of component 410A has expired.

In one embodiment, if the service processor attempts to access a protected register via an alternate path and/or proxy and the corresponding component's timer has not expired, the component may provide an indication to the service processor that its timer has not expired. In this manner, the service processor may determine that the component is in fact receiving the timer update commands from the service processor and the component is still "alive".

Figure 4:
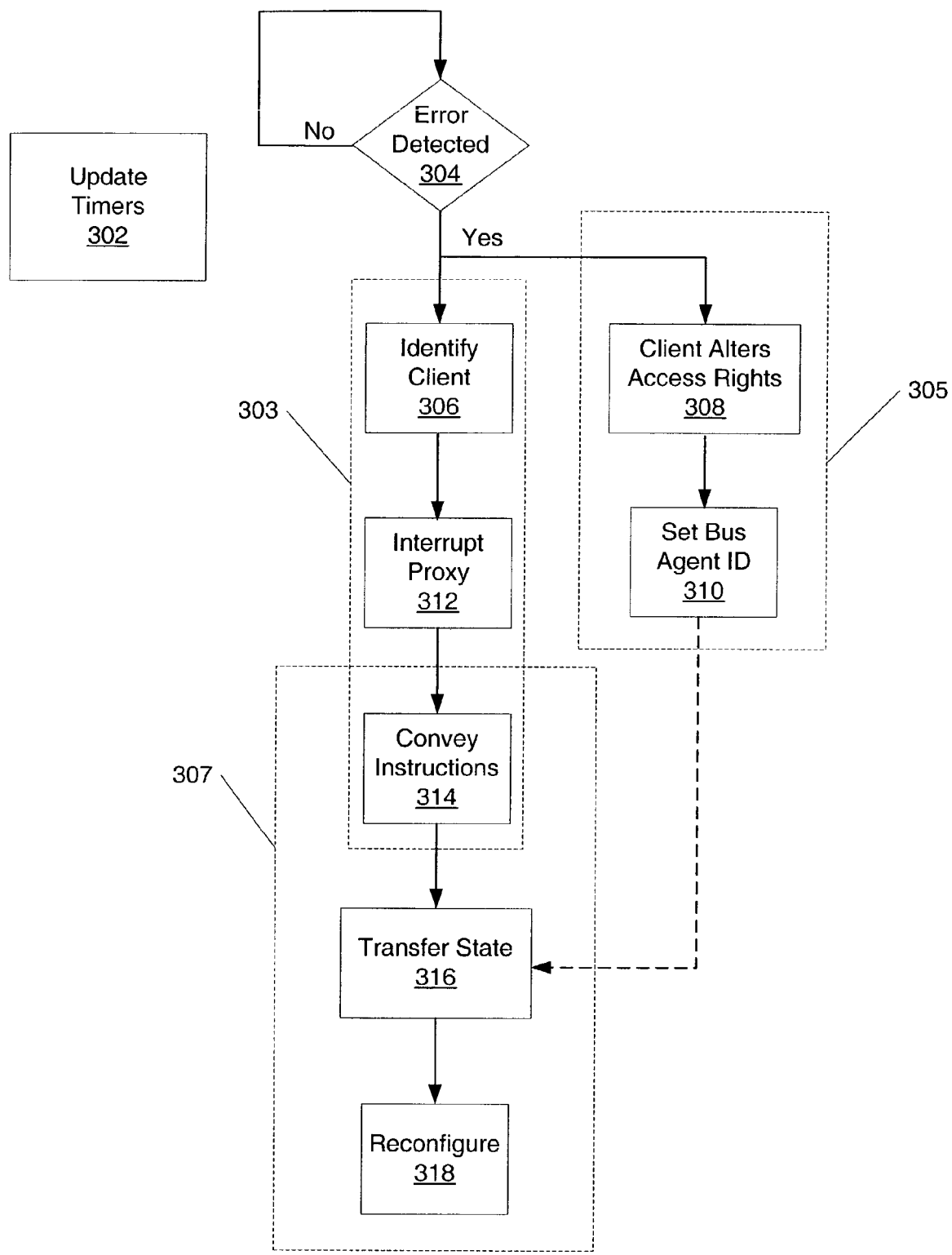
FIG. 4 shows one example of a method for accessing a control status register.

FIG. 4 illustrates one embodiment of a method in accordance with the foregoing description. In the illustrated method, clients which are configurable by a service processor include a timer which is periodically reset/updated (block 302) by the service processor. Generally, a prescribed period of time may be established for the resetting/updating of timers. In one embodiment, timers may comprise a counter. Clients may then be configured to detect when its timer has not been updated within that period of time. For example, the service processor may be configured to reset a timer/counter to zero every ten clock cycles. Each clock cycle the timer is incremented. If then a client detects its timer has a value of ten or greater, the client detects an error condition has occurred.

Concurrent with the updating of timers (block 302), the service processor may detect a communication problem with a particular client. Such a problem may be detected by a failure to receive an acknowledgement from the client, failure to detect some type of "heartbeat", by receiving an indication in response to the service processor attempting a register access or issuing a command, or by receiving an explicit indication that a client timer has not been updated (i.e., has "expired") within the prescribed period of time. As already described, this indication may be conveyed to the service processor by the affected client. Upon detection of this problem, the service processor and affected client may perform particular activities concurrently. The service processor identifies the affected client (block 306), interrupts a proxy (block 312) which will be used to access the affected client, and begins conveying instructions (block 314) to the proxy to manage the problem. In one embodiment, where a client timer has expired, the affected client acts to alter access rights (block 308) to its protected registers. Such alteration may include removing all access restrictions, or may involve changing permission for access from the service processor (ID) to an alternate bus agent ID (block 310), to a special command type, or to some other type of indication. In an embodiment which utilizes bus master IDs, an alternate bus agent may be predetermined, though other embodiments involving dynamic determinations are contemplated as well. Finally, the service processor directs the proxy to transfer any desired state (block 316) and reconfigure the affected client (block 318) so that it does not impair or adversely affect system operation or performance.

The embodiment of FIG. 4 shows various activities which are performed by the service processor (block 303), affected client (block 305), and proxy (307). In the embodiment shown, the action of conveying instructions (block 314) is shown to involve both the service processor (block 303) and the proxy (block 307). This may represent a scenario wherein the service processor is conveying instructions to the proxy which are then conveyed by the proxy to the affected client. Other embodiments are possible and are contemplated. It is noted that while the activities in FIG. 4 are illustrated as occurring in a particular sequence, and/or concurrent with other activities, these features are intended to be exemplary only. Those skilled in the art will recognize various ways exists for achieving that which is illustrated in FIG. 4.

While the above description describes a service processor and clients such as memory controllers or processors, it is to be understood that the method and mechanism described herein may be applicable to a wide variety of masters (other than service processors) and clients. Numerous variations and modifications will become apparent to those skilled in the art once the above disclosure is fully appreciated. It is intended that the following claims be interpreted to embrace all such variations and modifications.

What is claimed is:

1. A method for use in a system including registers with limited access rights, said method comprising:
   configuring access rights to a client register of a client, wherein said access rights indicate the register is only accessible by one or more authorized entities including a first master;
   conveying an indication from said first master to said client, wherein a timer of said client is configured to be updated in response to said indication;
   detecting in said client a first condition, said first condition comprising said timer has not been updated within a first period of time; and
   altering said access rights to permit access by a previously unauthorized second master, wherein said altering is performed by said client in response to said detecting.

2. The method as recited in claim 1, further comprising:
   said second master attempting to access said client register; and
   said client allowing said second master to access said register in response to detecting said access rights indicate said second master is permitted to access said register.

3. The method as recited in claim 2, wherein allowing said second master to access said register is in further response to detecting said first condition.

4. The method as recited in claim 2, further comprising:
   conveying an error indication from said client to said first master in response to said detecting; and
   said first master utilizing said second master as a proxy to access said client register in response to detecting said error indication.

5. The method as recited in claim 4, further comprising reconfiguring said system to exclude said client.

6. The method as recited in claim 5, wherein said reconfiguring includes transferring state from said client to an alternate client.

7. The method as recited in claim 1, wherein said first master comprises a service processor.

8. A system comprising:
   a first master; and
   a plurality of clients coupled to said first master, wherein each of said clients include a timer configured to be updated responsive to an indication received from the first master;
   wherein a first client of said clients includes a register with access rights indicating access is only permitted by one or more authorized entities including the first master, and wherein in response to detecting a timer of said first client has not been updated within a first period of time, said first client is configured to alter said access rights to permit access by a previously unauthorized second master.

9. The system as recited in claim 8, wherein said first master comprises a service processor, said second master is configured to attempt to access said client register responsive to an indication received from the service processor, and said client is configured to allow said second master to access said register in response to detecting said access rights indicate said second master is permitted to access said register.

10. The system as recited in claim 9, wherein said client is configured to allow said second master to access said register in further response to detecting said timer has not been updated within a first period of time.

11. The system as recited in claim 9, wherein the client is further configured to convey an error indication from said client to said first master in response to said detecting, and said first master is configured to utilize said second master as a proxy to access said client register in response to detecting said error indication.

12. The system as recited in claim 11, wherein the first master is configured to use said proxy to reconfigure the client out of the system.

13. The system as recited in claim 12, wherein said first master is further configured to use said proxy to transfer state from the client to an alternate client prior to reconfiguring the client out of the system.

14. The system as recited in claim 8, wherein said first master is coupled to each of said clients via a service processor bus.

15. The system as recited in claim 14, wherein each of said clients are coupled to an operations bus.

16. A client comprising:
   one or more components accessible by an external first master; and
   a control unit including a register configured for access by only one or more authorized entities including the first master;
   wherein the client includes a timer corresponding to the register, wherein the timer is configured to be updated in response to an indication received from the service processor, and wherein in response to detecting the timer has not been updated within a first period of time, said control unit is configured to alter the access rights of the register to permit access by a previously unauthorized second master.

17. The client as recited in claim 16, wherein the control unit is configured to allow the second master to access the register in response to detecting the access rights indicate the second master is permitted to access said register.

18. The client as recited in claim 17, wherein the control unit is configured to allow the second master to access the register in further response to detecting that the timer has not been updated within a first period of time.

19. The client as recited in claim 16, wherein the control unit is further configured to convey an error indication to the first master in response to said detecting.

20. The client as recited in claim 16, wherein the control unit is configured to distinguish the first master from the second master via a bus master ID received with an attempted access to the register.

21. A method for use in a system including registers with limited access rights, said method comprising:

receiving a command to update a timer within a first client, said command being configured to prevent said timer from expiring;

detecting a first command from a first master, said first command being configured to access a register corresponding to said client, wherein access rights corresponding to said register indicate the register is only accessible by said first command if said timer has expired; and denying access to said register by said first command in response to detecting said timer has not expired.

22. The method of claim 21, further comprising conveying an error signal indicating an unauthorized access by said first master has been attempted.

23. A system comprising:

a first master; and a client coupled to said first master, wherein said client includes:

a timer configured to be updated responsive to an indication received from the first master; and a register with access rights indicating access is only permitted by one or more authorized entities including the first master;

wherein in response to detecting a first command from a second master, said first command being configured to access said register, said client is configured to:

deny access to said register by said first command in response to detecting said timer has not expired.

24. The system of claim 23, wherein said client is further configured to convey an error signal to said first master indicating an unauthorized access by said second master has been attempted.

25. A client comprising:

a timer configured to be updated responsive to an indication received from a first master; and a register with access rights indicating access is only permitted by one or more authorized entities including the first master;

wherein in response to detecting a first command from a second master, said first command being configured to access said register, said client is configured to:

deny access to said register by said first command in response to detecting said timer has not expired.

26. The client of claim 25, wherein said client is further configured to convey an error signal to said first master indicating an unauthorized access by said second master has been attempted.

* * * * *